BEST AVAILABLE COPY

Jan. 16, 1934. A. E. NORTHUP Re. 19,052

AUTOMOBILE BODY

Original Filed Feb. 17, 1932

INVENTOR
Amos E. Northup.
BY
Harness, Dickey, Pierce & Hann.
ATTORNEYS.

BEST AVAILABLE COPY

Reissued Jan. 16, 1934

Re. 19,052

UNITED STATES PATENT OFFICE 19,052

DESIGN FOR AN AUTOMOBILE BODY

Amos E. Northup, Pleasant Ridge, Mich., assignor to The Murray Corporation of America, Detroit, Mich., a corporation of Delaware Original No. 89,448, March 14, 1933, Serial No. 42,895, February 17, 1932, for 3½ years. Application for reissue March 16, 1933, Serial No. 47,480. Term of patent 14 years

*To the Commissioner of Patents:*

Be it known that I, AMOS E. NORTHUP, a citizen of the United States, and resident of Pleasant Ridge, in the county of Oakland, State of Michigan, have invented the new, original, and ornamental Design for Automobile Bodies, of which the following is a specification, reference being had to the accompanying drawing, forming a part thereof, wherein.

Figure 1:
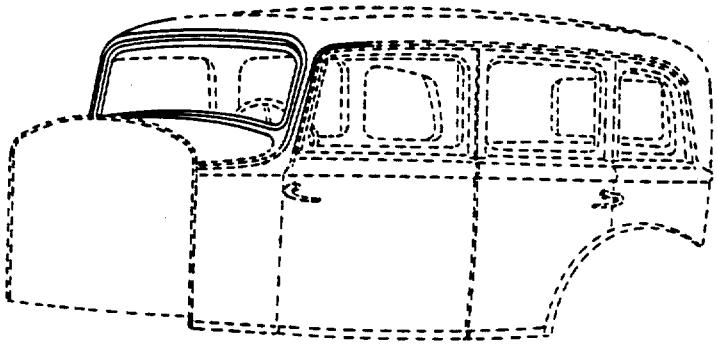
Fig. 1 is a perspective view of the forward end and side of the automobile body.
Figure 2:
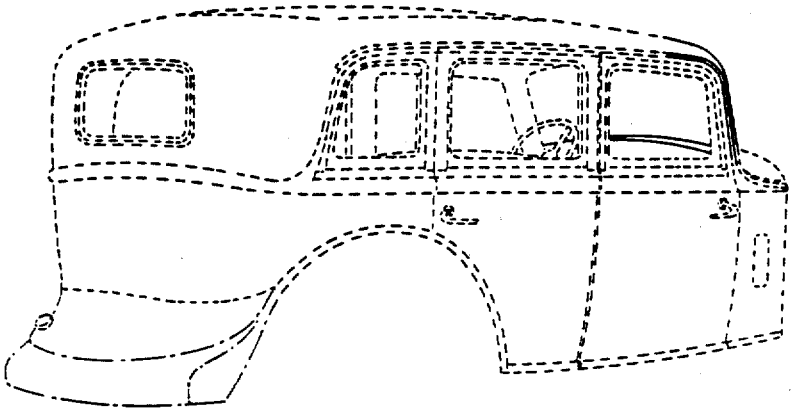
Fig. 2 is a perspective view of the rear end and opposite side of the automobile body.

The dominant feature of my new design comprises the appearance of the forward corners and parts surrounding the windshield, as shown in the full lines. The parts shown in the dotted lines are illustrative of a conventional standard type of automobile body, except the rear end shown in dot-and-dash lines (Fig. 2) which is the subject of my co-pending application Serial No. D-43,956, filed June 2, 1932. The said dominant feature may be employed and embodied without substantial change, in the following conventional types of closed automobile bodies: coupés, four-door sedans, coaches or two-door sedans and victorias.

I claim:

The ornamental design for an automobile body substantially as shown and described.

AMOS E. NORTHUP.